(12) United States Patent
Min et al.

(10) Patent No.: US 7,330,623 B2
(45) Date of Patent: Feb. 12, 2008

(54) LIGHT GUIDE PANEL AND BACK LIGHT UNIT HAVING THE SAME

(75) Inventors: Jee-hong Min, Yongin-si (KR);
Young-chan Kim, Suwon-si (KR);
Seung-ho Nam, Seongnam-si (KR);
Kyung-yeup Kim, Yongin-si (KR)

(73) Assignee: Samsung Electronics Co., Ltd., Suwon (KR)

( * ) Notice: Subject to any disclaimer, the term of this patent is extended or adjusted under 35 U.S.C. 154(b) by 41 days.

(21) Appl. No.: 11/452,926

(22) Filed: Jun. 15, 2006

(65) Prior Publication Data
US 2007/0133099 A1 Jun. 14, 2007

(30) Foreign Application Priority Data
Dec. 8, 2005 (KR) ............... 10-2005-0120068

(51) Int. Cl.
*G02B 6/10* (2006.01)
(52) U.S. Cl. .............. 385/129; 385/130; 385/131
(58) Field of Classification Search .......... 385/129
See application file for complete search history.

(56) References Cited
FOREIGN PATENT DOCUMENTS
KR 2000-0057869 A 9/2000

*Primary Examiner*—Frank G. Font
*Assistant Examiner*—Mary El-Shammaa
(74) *Attorney, Agent, or Firm*—Sughrue Mion, PLLC

(57) ABSTRACT

A light guide panel and a back light unit having the same are provided. The light guide panel includes an isotropic layer and an anisotropic layer. The isotropic layer includes an incident light surface, a transmission surface, and a polarization recycling unit, disposed opposite the transmission surface, which changes a polarization direction of light. The isotropic layer has a first refractive index. The anisotropic layer is formed on the transmission surface and includes a selectively transmitting and reflecting surface opposite the transmission surface, which reflects a first portion of incident light and transmits a second portion of incident light. The anisotropic layer has a first refractive index, identical to the first refractive index of the isotropic layer, with respect to light having a first polarization and has a second refractive index, different from the first refractive index with respect to light having a second polarization.

23 Claims, 11 Drawing Sheets

LIGHT GUIDE PANEL AND BACK LIGHT UNIT HAVING THE SAME

CROSS-REFERENCE TO RELATED PATENT APPLICATIONS

This application claims priority from Korean Patent Application No. 10-2005-0120068, filed on Dec. 8, 2005, in the Korean Intellectual Property Office, the disclosure of which is incorporated herein in its entirety by reference.

BACKGROUND OF THE INVENTION

1. Field of the Invention

Apparatuses and methods consistent with the present invention relate to a light guide panel in which luminous efficiency is improved using polarization recycling, and a back light unit having the same.

2. Description of the Related Art

Traditionally, back light units are used as light sources for displays, such as liquid crystal displays (LCDs), that are not self-luminescent but rather form an image using incident light from an external source.

Back light units can be classified as direct light emitting type back light units or as edge light emitting type back light units, depending on whether a light guide panel (LGP) is used and on the arrangement of a light source.

In direct light emitting type back light units, a lamp installed opposite a surface of an LCD directly irradiates light onto a liquid crystal panel. On the other hand, in edge light emitting type back light units, an LGP is disposed opposite the liquid crystal panel, and a light source is disposed at an edge of the LGP so that light irradiated from the light source is guided by the LGP to be transmitted to the liquid crystal panel.

A liquid crystal panel selectively transmits incident light according to the polarization direction of the light, and only that light which is polarized in a predetermined direction is utilized.

FIG. 1 is a perspective view of a conventional LGP. The LGP 1 has a flat panel type structure with a rectangular parallelepiped. The LGP 1 includes an incident light surface 3 on which light L is incident, an opposite surface 5 formed on a surface opposite to the incident light surface 3, a reflection surface 7 which reflects the light L incident through the incident light source 3 toward the opposite surface 5, and an emitted light surface 9, which is opposite the reflection surface 7 and from which the light is emitted.

The conventional LGP 1 having the above structure has a reflection surface 7 with a planar structure. Thus, a polarization direction of incident light is not changed by the reflection surface 7. Thus, the polarization direction of light incident on an LCD panel and the polarization direction of light reflected from the reflection surface 7 are identical to each other.

A change of polarization direction will now be described with reference to FIGS. 2A and 2B and Tables 1 and 2.

FIG. 2A illustrates polarization directions of light incident through the incident surface 3 when ten light beams are incident on the LGP 1 illustrated in FIG. 1 at an incident angle θi=60°. Table 1 shows values of polarization of light L on the X-, Y-, and Z-axes.

TABLE 1

| Light | X | Y | Z |
|---|---|---|---|
| 1 | 0.0000000 | 0.9421752 | 0.3351206 |
| 2 | 0.0000000 | 0.9421752 | 0.3351206 |
| 3 | 0.0000000 | 0.9421752 | 0.3351206 |
| 4 | 0.0000000 | 0.9421752 | 0.3351206 |
| 5 | 0.0000000 | 0.9421752 | 0.3351206 |
| 6 | 0.0000000 | 0.9421752 | 0.3351206 |
| 7 | 0.0000000 | 0.9421752 | 0.3351206 |
| 8 | 0.0000000 | 0.9421752 | 0.3351206 |
| 9 | 0.0000000 | 0.9421752 | 0.3351206 |
| 10 | 0.0000000 | 0.9421752 | 0.3351206 |

FIG. 2A and Table 1 illustrate that light is linearly polarized in an Y-Z direction.

FIG. 2B illustrates polarization directions of light reflected from the reflection surface 7 when ten beams of light are incident on the LGP 1 illustrated in FIG. 1 at an incident angle $\theta_i$=60°. Table 2 shows polarization values of light L on the X-, Y-, and Z-axes.

TABLE 2

| Light | X | Y | Z |
|---|---|---|---|
| 1 | 0.0000000 | 0.9421752 | 0.3351206 |
| 2 | 0.0000000 | 0.9421752 | 0.3351206 |
| 3 | 0.0000000 | 0.9421752 | 0.3351206 |
| 4 | 0.0000000 | 0.9421752 | 0.3351206 |
| 5 | 0.0000000 | 0.9421752 | 0.3351206 |
| 6 | 0.0000000 | 0.9421752 | 0.3351206 |
| 7 | 0.0000000 | 0.9421752 | 0.3351206 |
| 8 | 0.0000000 | 0.9421752 | 0.3351206 |
| 9 | 0.0000000 | 0.9421752 | 0.3351206 |
| 10 | 0.0000000 | 0.9421752 | 0.3351206 |

FIG. 2B and Table 2 illustrate that light is linearly polarized in the Y-Z direction. The polarization direction and values of reflected light is identical to that of the incident light described with reference to FIG. 2A and Table 1.

Thus, when unpolarized light is incident on the LGP 1, light emitted through the emitted light surface 9 also has the same polarization characteristics as the incident light and thus is also unpolarized light. Therefore, when the LGP 1 is used for illumination of an LCD screen, which utilizes only light polarized in a predetermined direction, luminous efficiency is lowered.

SUMMARY OF THE INVENTION

Exemplary embodiments of the present invention provide an LGP having increased luminous efficiency in which emitted light is polarized in a predetermined direction, and a back light unit having the same.

According to an exemplary embodiment of the present invention, an LGP comprises an isotropic layer and an anisotropic layer. The isotropic layer comprises an incident light surface through which light from a light source is incident, a transmission surface through which light is transmitted, and a polarization recycling unit disposed on a surface of the isotropic layer opposite the transmission surface. The polarization recycling unit changes a polarization direction of light. The isotropic layer has a first refractive index. The anisotropic layer is formed on the transmission surface of the isotropic layer. The anisotropic layer comprises a selectively transmitting and reflecting surface, disposed opposite the transmission surface of the isotropic layer, which reflects a first portion of incident light and transmits a second portion of incident light. The anisotropic layer has a first refractive index, identical to the first refractive index of the isotropic layer, with respect to light having a first polarization. The anisotropic layer has a second refractive index, different from the first refractive index, with respect to light having a second polarization. Thus, light having the first polarization is transmitted without refraction at a boundary between the anisotropic layer and the transmission surface of the isotropic layer, and light having the second polarization is refracted and transmitted at the boundary between the anisotropic layer and the transmission surface of the isotropic layer.

According to another exemplary embodiment of the present invention, an LGP comprises an isotropic layer, a first anisotropic layer, and a second isotropic layer. The isotropic layer comprises an incident light surface, through which light from a light source is incident, and first and second transmission surfaces. the first and second transmission surfaces are opposite each other and light is transmitted through the first and second transmission surfaces. The first anisotropic layer is disposed on the first transmission surface of the isotropic layer and comprises a selectively transmitting and reflecting surface disposed opposite the first transmission surface. The selectively transmitting and reflecting surface reflects a first portion of incident light and transmits a second portion of incident light. The first anisotropic layer has a first refractive index, identical to the first refractive index of the isotropic layer, which respect to light having a first polarization. The first anisotropic layer has a second refractive index, different from the first refractive index, with respect to light having a second polarization. Thus, light having the first polarization is transmitted without refraction at a boundary between the first anisotropic layer and the first transmission surface of the isotropic layer and light having the second polarization is refracted and transmitted at the boundary between the first anisotropic layer and the first transmission surface of the isotropic layer. The second anisotropic layer is disposed on the second transmission surface of the isotropic layer and comprises a polarization recycling unit disposed opposite the second transmission surface. The polarization recycling unit changes a polarization direction of light. Light having the first polarization is transmitted without refraction at a boundary between the second transmission surface of the isotropic layer and the second anisotropic layer, and light having the second polarization is reflected at the boundary between the second transmission surface of the isotropic layer and the second anisotropic layer. The second anisotropic layer has a first refractive index, identical to the first refractive index of the isotropic layer, with respect to light having the first polarization. The second anisotropic layer has a third refractive index, different from the first refractive index, with respect to light having the second polarization.

According to another exemplary embodiment of the invention, an LGP comprises a first isotropic layer, a first anisotropic layer, a second anisotropic layer, and a second isotropic layer. The first isotropic layer comprises an incident light surface, through which light from a light source is incident, and first and second transmission surfaces. The first and second transmission surfaces are opposite each other and transmit light. The isotropic layer has a first refractive index. The first anisotropic layer is disposed on the first transmission surface of the isotropic layer and comprises a selectively transmitting and reflecting surface. The selectively transmitting and reflecting surface is disposed opposite the first transmission surface, reflects a first portion of incident light, and transmits a second portion of incident light. The first anisotropic layer has a first refractive index, identical to the first refractive index of the isotropic layer, with respect to light having a first polarization. The first anisotropic layer has a second refractive index, different from the first refractive index, with respect to light having a second polarization. Light having the first polarization is transmitted without refraction at a boundary between the first anisotropic layer and the first transmission surface of the isotropic layer. Light having the second polarization is refracted and transmitted at the boundary between the first anisotropic layer and the first transmission surface of the isotropic layer. The second anisotropic layer is disposed on the second transmission surface of the isotropic layer. Light having the first polarization is transmitted without refraction at a boundary between the second transmission surface of the isotropic layer and the second anisotropic layer, and light having the second polarization is reflected at the boundary between the second transmission surface of the isotropic layer and the second anisotropic layer. The second anisotropic layer has a first refractive index, identical to the first refractive index of the isotropic layer, with respect to light having the first polarization, and has a third refractive index, different from the first refractive index, with respect to light having the second polarization. The second isotropic layer comprises a third transmission surface and a polarization recycling unit. The third transmission surface is at a boundary between the second anisotropic layer and the second isotropic layer. The polarization recycling unit is disposed opposite the third transmission surface, and the polarization recycling unit changes the polarization direction of light. The second isotropic layer has a first refractive index, identical to the first refractive index of the first isotropic layer.

According to another exemplary embodiment of the present invention, there is provided a back light unit comprising at least one light source and an LGP having a structure according to one of the above-described exemplary embodiments.

BRIEF DESCRIPTION OF THE DRAWINGS

The above and other exemplary aspects and features of the present invention will become more apparent from the following detailed description of exemplary embodiments thereof with reference to the attached drawings in which.

DETAILED DESCRIPTION OF EXEMPLARY EMBODIMENTS OF THE INVENTION

Figure 1:
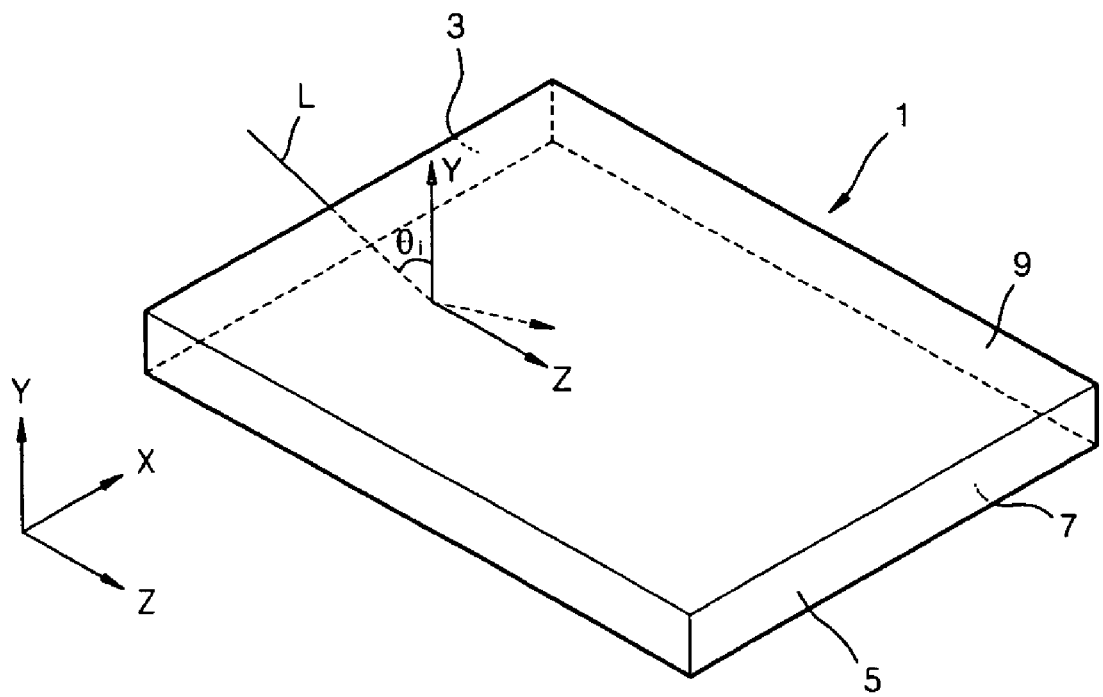
FIG. 1 is a perspective view of a conventional LGP.
Figure 2A:
FIG. 2A illustrates polarization directions of incident light when ten light beams are incident on the LGP illustrated in FIG. 1 at an incident angle θi=60°.
Figure 2A:
Figure 2A:
Figure 2B:
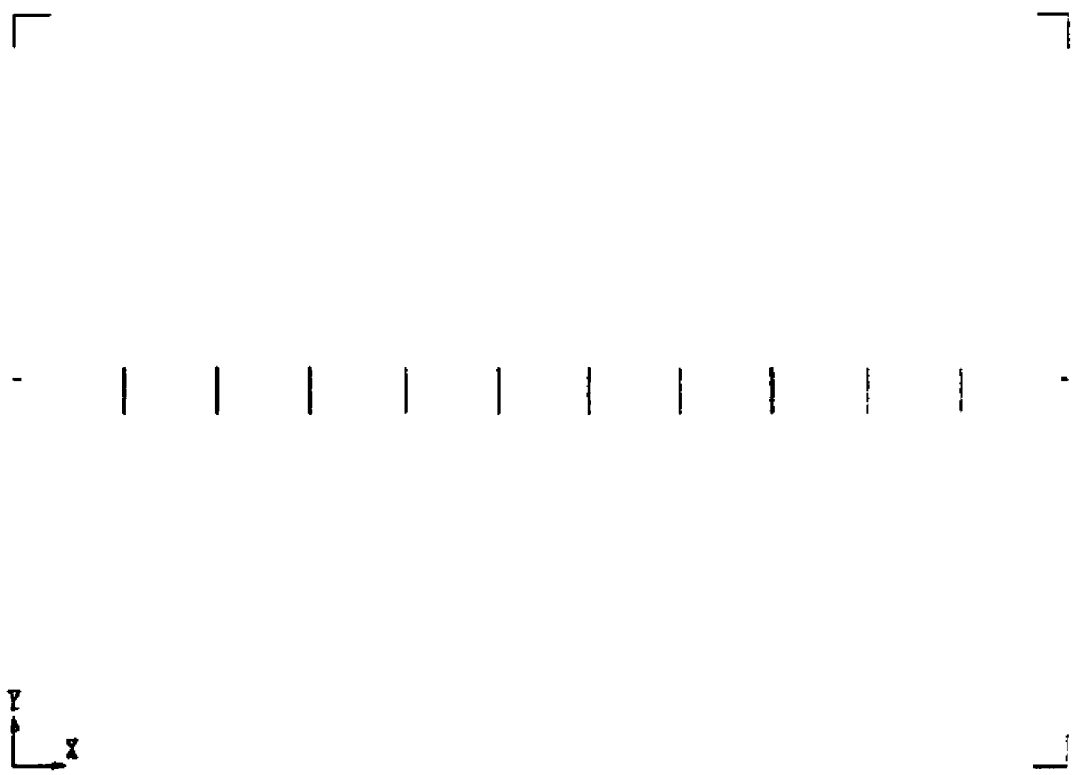
FIG. 2B illustrates polarization directions of reflected light when ten light beams are incident on the LGP illustrated in FIG. 1 at an incident angle θi=60°.

The present invention will now be described more fully with reference to the accompanying drawings, in which exemplary embodiments of the invention are shown.

Referring to FIGS. 3, 4, 5, 6A, and 6B, the LGP 10 includes an isotropic layer 11 formed of an isotropic medium, having a first refractive index that is not dependent on a polarization direction of incident light, and a first anisotropic layer 17 formed on the isotropic layer 11.

The isotropic layer 11 includes an incident light surface 11a, on which light L11 is incident; a transmission surface 11c, which transmits the incident light to the external environment, and a polarization recycling unit 13. The isotropic layer 11 further includes an opposite surface 11b formed on a surface opposite the incident light surface 11a. The polarization recycling unit 13 is formed on a surface opposite the transmission surface 11c and the polarization recycling unit 13 reflects light toward the opposite surface 11b and changes a polarization direction of the incident light.

The first anisotropic layer 17 is formed on the transmission surface 11c. The first anisotropic layer 17 includes a selectively transmitting and reflecting surface 17a which is formed on a surface opposite the transmission surface 11c and at which a portion of incident light is transmitted and another portion thereof is reflected. The first anisotropic layer 17 is formed of an anisotropic material having different refractive indices depending on a polarization direction of the incident light L11. That is, with respect to light $L_{13}$, polarized in a first direction, the first anisotropic layer 17 has a first refractive index which is the same as a refractive index of the isotropic layer 11, and with respect to light $L_{12}$, polarized in a second direction different from the first direction, the first anisotropic layer 17 has a second refractive index different from the first refractive index. Thus, the light $L_{13}$, polarized in the first direction, is transmitted without refraction at a boundary with the transmission surface 11c. On the other hand, the light $L_{12}$ polarized in the second direction, is refracted and transmitted according to Snell's law at a boundary with the transmission surface 11c. According to a critical angle total reflection principle, the light $L_{13}$ is totally reflected by the selectively transmitting and reflecting surface 17a and is reflected toward the polarization recycling unit 13. The light $L_{12}$ is refracted and transmitted at the selectively transmitting and reflecting surface 17a.

The isotropic layer 11 refracts and transmits the light $L_{12}$, polarized in the second direction, and may further include a plurality of refraction prisms 15 formed on the transmission surface 11c. Thus, when the light $L_{12}$ progresses toward the anisotropic layer 17 from the isotropic layer 11, it is refracted to a direction close to a direction perpendicular to the transmission surface 11c due to a refractive index difference and the geometric shape of the refraction prisms 15.

As described above, when the light $L_{12}$ is refracted and transmitted by the transmission surface 11c and the refraction prisms 15, the second refractive index (which is the refractive index of the isotropic layer 17 with respect to light $L_{12}$, polarized in the second direction) may be larger than the first refractive index (which is the refractive index of the isotropic layer 11 and the anisotropic layer 17 with respect to the light $L_{13}$, polarized in the first direction). For example, the first refractive index may have a value of about 1.6, and the second refractive index may have a value of about 1.8.

Figure 4:
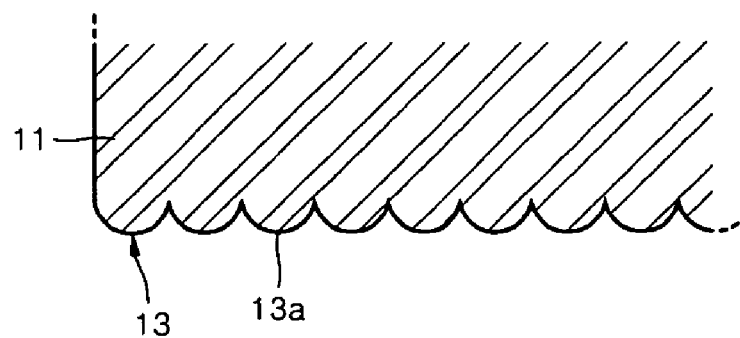
FIG. 4 is a partial cross-sectional view of a polarization recycling unit of the LGP illustrated in FIG. 3 according to an exemplary embodiment of the present invention.
Figure 5:
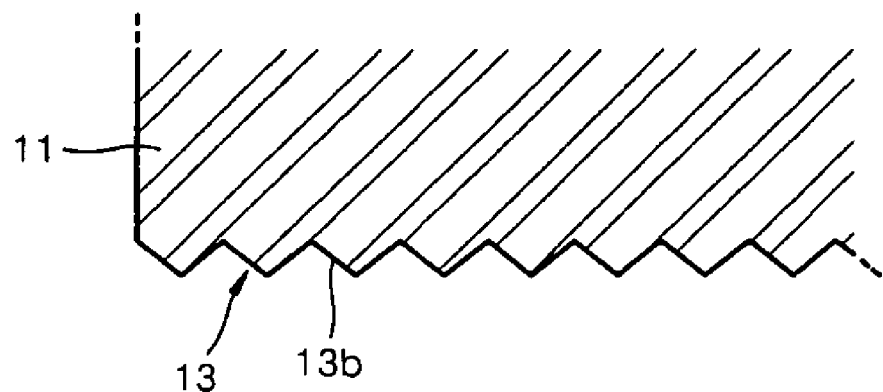
FIG. 5 is a partial cross-sectional view of a polarization recycling unit of the LGP illustrated in FIG. 3 according to another exemplary embodiment of the present invention.

The polarization recycling unit 13 includes a plurality of polarization conversion members 13a and 13b which are adjacent to each other in an X-axis direction which is a direction perpendicular to an incident optical axis (the Z-axis direction). Each of the polarization conversion members 13a and 13b is formed so that its length direction is parallel to the incident optical axis Z. Here, the polarization conversion member of the polarization recycling unit 13 may include a polarization conversion member 13a having a cylindrical shape as illustrated in FIG. 4, and/or a polarization conversion member 13b having a prism shape as illustrated in FIG. 5.

A change of a polarization direction caused by the polarization recycling unit 13 will now be described with reference to FIGS. 6A and 6B and Tables 3 and 4.

Figure 3:
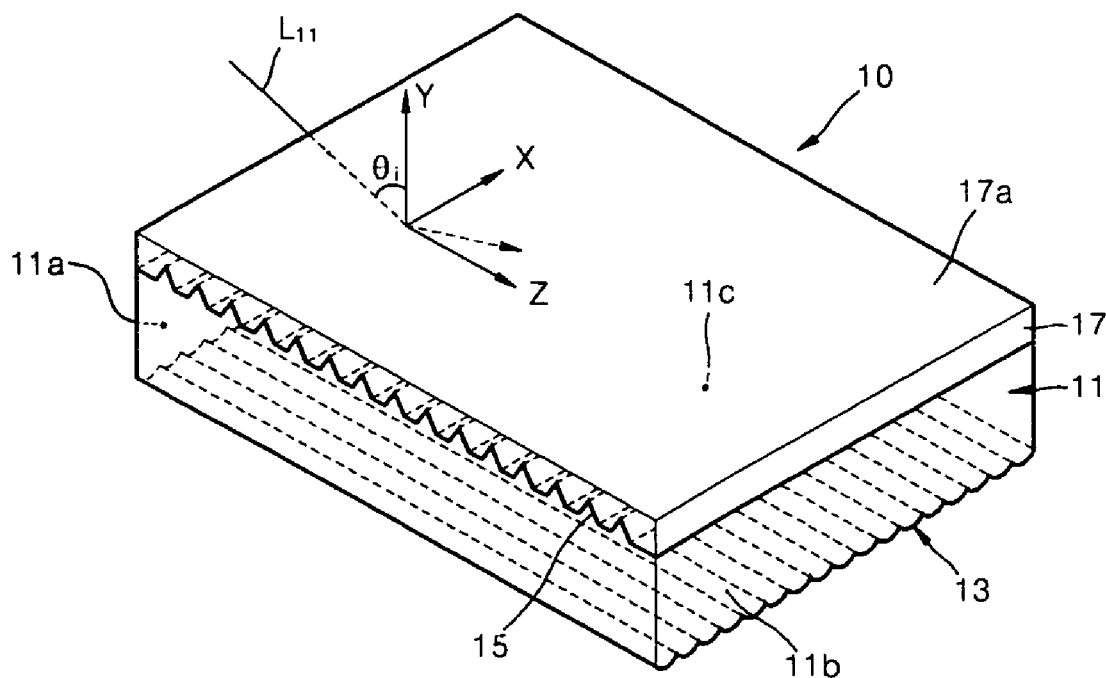
FIG. 3 is a schematic perspective view of a LGP according to an exemplary embodiment of the present invention.
Figure 6A:
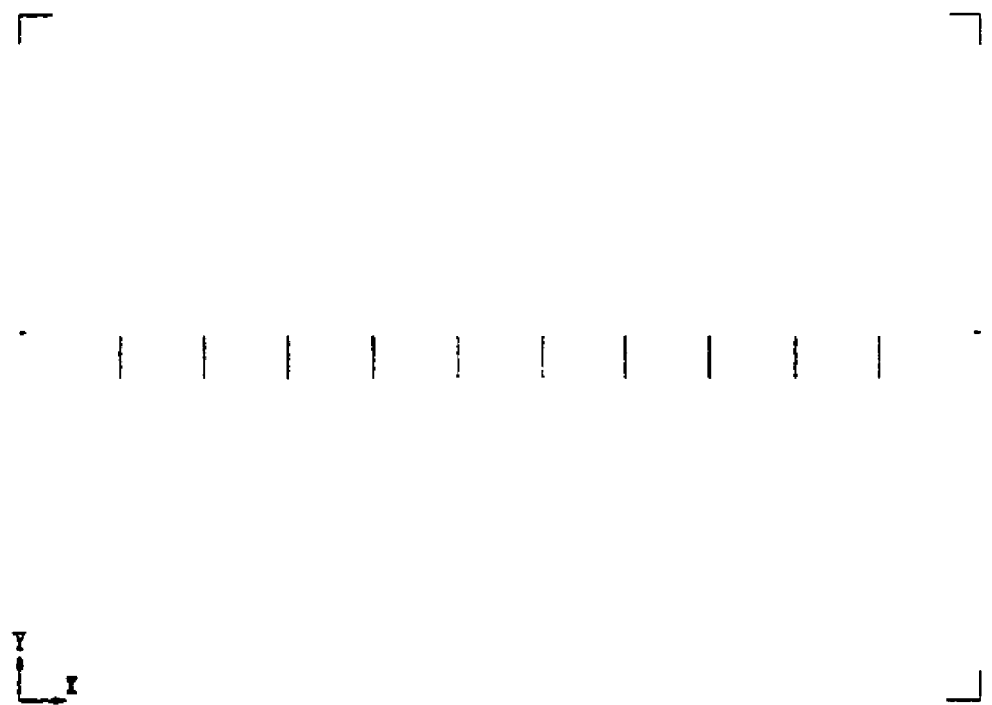
FIG. 6A shows the polarization direction of incident light when light is incident on the LGP illustrated in FIG. 3 at an incident angle of 60°.

FIG. 6A shows polarization directions of light incident through the incident light surface 11a when ten light beams $L_{11}$ are incident on the LGP illustrated in FIG. 3 at an incident angle of 60°. Table 3 shows polarization values of light $L_{11}$ on the X-, Y-, and Z-axes.

TABLE 3

| Light | X | Y | Z |
|---|---|---|---|
| 1 | 0.0000000 | 0.9421752 | 0.3351206 |
| 2 | 0.0000000 | 0.9421752 | 0.3351206 |
| 3 | 0.0000000 | 0.9421752 | 0.3351206 |
| 4 | 0.0000000 | 0.9421752 | 0.3351206 |
| 5 | 0.0000000 | 0.9421752 | 0.3351206 |
| 6 | 0.0000000 | 0.9421752 | 0.3351206 |
| 7 | 0.0000000 | 0.9421752 | 0.3351206 |
| 8 | 0.0000000 | 0.9421752 | 0.3351206 |
| 9 | 0.0000000 | 0.9421752 | 0.3351206 |
| 10 | 0.0000000 | 0.9421752 | 0.3351206 |

Table 3 is used to compare the LGP illustrated in FIG. 3 with the LGP according to the comparison example illustrated in Table 1. Referring to FIG. 6A and Table 3, light which is linearly polarized in an Y-Z axis direction and having the same polarization direction and size as that of the comparison example illustrated in Table 1 are incident on the LGP.

Figure 6B:
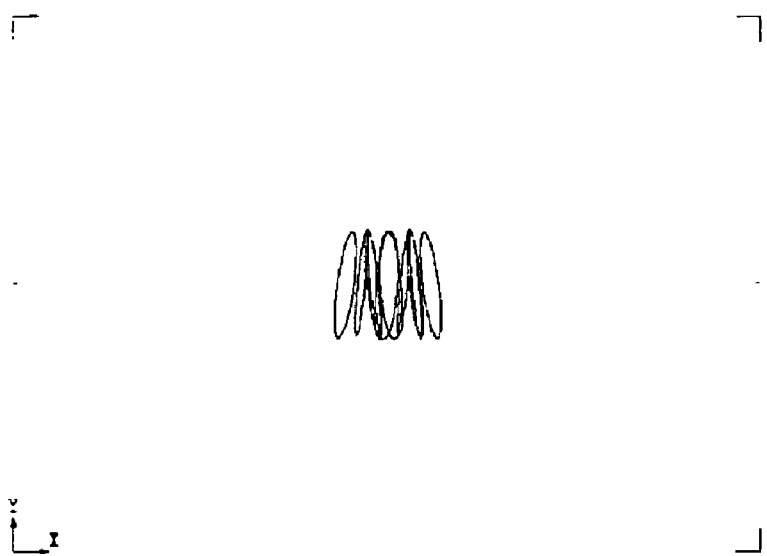
FIG. 6B shows the polarization directions of reflected light when light is incident on the LGP illustrated in FIG. 3 at an incident angle of 60°.

FIG. 6B shows polarization directions of light reflected by the polarization recycling unit 13 when ten light beams $L_{11}$ are incident on the LGP illustrated in FIG. 3 at an incident angle of 60°. Table 4 shows polarization values of light $L_{11}$ on the X-, Y-, and Z-axes.

TABLE 4

| Light | X | Y | Z |
|---|---|---|---|
| 1 | 0.1292337 | 0.9702179 | −0.2048803 |
| 2 | 0.0902551 | 0.9475368 | 0.3066399 |
| 3 | 0.1068903 | −0.9789351 | 0.1739556 |
| 4 | 0.0902578 | −0.9475372 | −0.3066378 |
| 5 | 0.0573353 | −0.9871122 | 0.1494064 |
| 6 | 0.0573359 | 0.9871129 | −0.1494015 |
| 7 | 0.0902551 | 0.9475368 | 0.3066399 |
| 8 | 0.1068926 | −0.9789324 | 0.1739696 |
| 9 | 0.0902578 | −0.9475372 | −0.3066378 |
| 10 | 0.1292326 | −0.9702172 | 0.2048841 |

Referring to FIG. 6B and Table 4, polarization values of the ten light beams $L_{11}$ in the Y-axis direction and in the Z-axis direction are changed while passing through the polarization recycling unit 13 and the ten light beams $L_{11}$ also become polarized in the X-axis direction.

A polarization recycling operation of the LGP 10 illustrated in FIG. 3 will now be described with reference to FIGS. 7A and 7B.

Figure 7A:
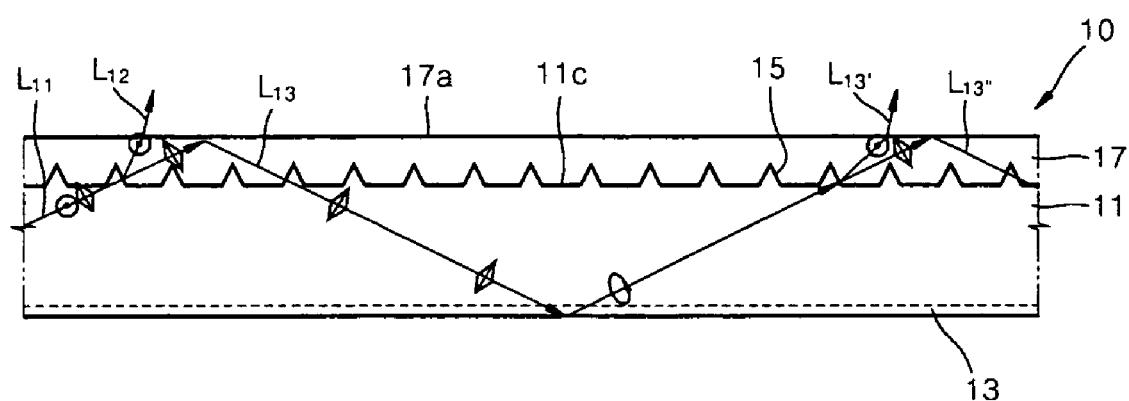
FIGS. 7A and 7B respectively illustrate polarization changes of light incident on the LGP illustrated in FIG. 3.

FIG. 7A illustrates light $L_{11}$ which is incident on the transmission surface 11a and divided into light $L_{13}$, polarized in the first direction, and $L_{12}$, polarized in the second direction. Light $L_{13}$ is reflected by the selectively transmitting and reflecting surface 17a toward the opposite surface 11b (see FIG. 3) and the polarization recycling unit 13. Light $L_{13}$ is then reflected by the polarization recycling unit 13 and its polarization direction is changed due to the shape of the polarization conversion members 13a and 13b of the polarization recycling unit 13, that is, a prism shape or a cylindrical shape. Thus, the light $L_{13}$, polarized in the first direction, that passes through the polarization recycling unit 13 includes first and second polarization components. Light $L_{13}'$, polarized in the second direction (the same as light $L_{12}$), is refracted and transmitted at the transmission surface 11c and the selectively transmitting and reflecting surface 17a. Light $L_{13}''$, polarized in the first direction (the same as light $L_{13}$), is transmitted without refraction by the transmission surface 11c and is totally reflected by the selectively transmitting and reflecting surface 17a. The light $L_{13}''$ is then incident on the polarization recycling unit 13 at a predetermined incident angle, and the above-described operation is repeatedly performed.

Figure 7B:
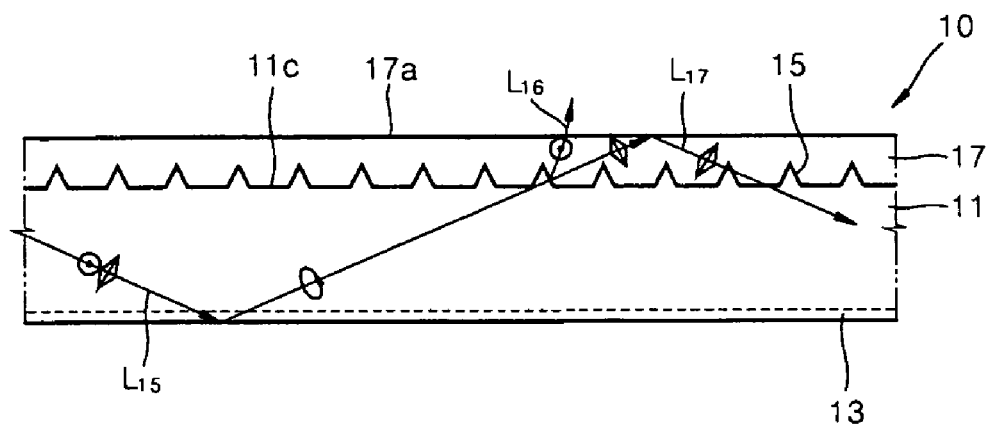

FIG. 7B illustrates unpolarized light $L_{15}$ which can be described as a vector having a first polarization component and a second polarization component. From the incident light surface 11(a) (see FIG. 3), the unpolarized light is reflected by the polarization recycling unit 13 such that its polarization direction is changed by the polarization recycling unit 13. The selectively transmitting and reflecting surface 17a divides the light into light $L_{17}$, polarized in a first direction, and $L_{16}$, polarized in a second direction. The light $L_{16}$ is refracted and transmitted at the transmission surface 11c and at the selectively transmitting and reflecting surface 17a. The light $L_{17}$ is transmitted without refraction at the transmission surface 11c and is reflected at the selectively transmitting and reflecting surface 17a. The light $L_{17}$ is then incident on the polarization recycling unit 13 at the same incident angle as the light $L_{13}$ (see FIG. 6A), and the above-described operation is repeatedly performed.

As described above, since the polarization recycling operation is repeatedly performed and only the light $L_{16}$, polarized in the first direction is transmitted by the selectively transmitting and reflecting surface 17a, the luminous efficiency of a display apparatus which utilizes light polarized in a predetermined direction can be increased.

Figure 8:
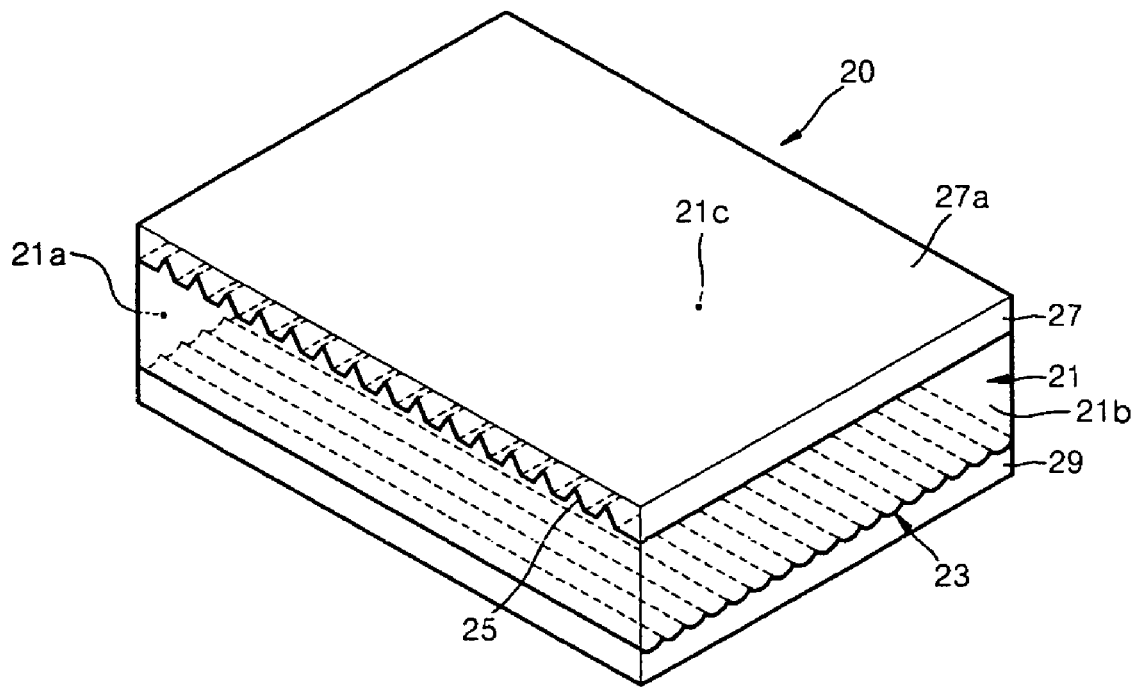
FIG. 8 is a schematic perspective view of an LGP according to another exemplary embodiment of the present invention.
Figure 9:
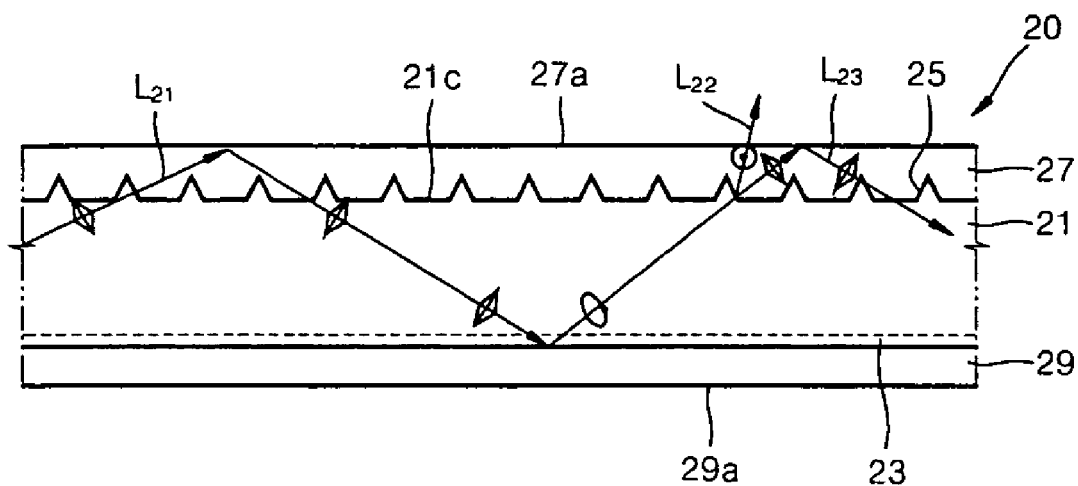
FIG. 9 illustrates a polarization change of P-polarized light incident on the LGP illustrated in FIG. 8.
Figure 10:
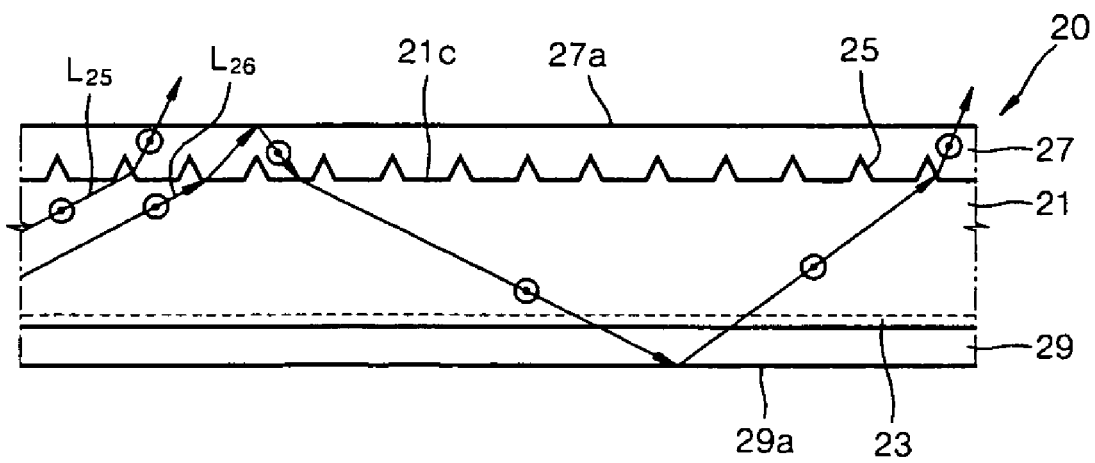
FIG. 10 illustrates a polarization change of S-polarized light incident on the LGP illustrated in FIG. 8.

FIG. 8 is a schematic perspective view of an LGP according to another exemplary embodiment of the present invention, and FIGS. 9 and 10 respectively illustrate a polarization change of P-polarized light and S-polarized light incident on the LGP illustrated in FIG. 8.

Referring to FIGS. 8, 9, and 10, the LGP 20 includes an isotropic layer 21 formed of an isotropic medium, having a refractive index which is not dependent on a polarization direction of incident light; a first anisotropic layer 27, formed on the isotropic layer 21; and a second anisotropic layer 29 formed under the isotropic layer 21.

The isotropic layer 21 includes an incident light surface 21a on which light is incident; an opposite surface 21b formed opposite the incident light surface 21a; a transmission surface 21c; and a polarization recycling unit 23. The isotropic layer 21 may further include a plurality of refraction prisms 25.

The polarization recycling unit 23 is formed opposite the transmission surface 21c and reflects and changes a polarization direction of incident light. The polarization recycling unit 23 and the refraction prisms 25 are substantially the same as those of the polarization recycling unit 13 and the refraction prisms 15 of the LGP 10 (see FIG. 3) and thus, a detailed description thereof will be omitted.

The first anisotropic layer 27 is formed on the transmission surface 21c. The first anisotropic layer 27 includes a selectively transmitting and reflecting surface 27a which is formed opposite the transmission surface 21c. The first anisotropic layer 27 is formed of an anisotropic material having different indices of refraction depending on the polarization direction of the incident light. That is, with respect to light $L_{21}$, polarized in a first direction (e.g. P-polarized light), the first anisotropic layer 27 has a first refractive index which is the same as the refractive index of the isotropic layer 21. With respect to light $L_{25}$, polarized in the second direction (e.g. S-polarized light), the first anisotropic layer 27 has a second refractive index different from the first refractive index. Thus, light $L_{21}$ is transmitted without refraction at the transmission surface 21c. On the other hand, light $L_{25}$ and light $L_{26}$ are refracted and transmitted at a boundary the transmission surface 21c. The light $L_{21}$ is totally reflected at the selectively transmitting and reflecting surface 27a and is directed to the polarization recycling unit 23 according to a critical angle total reflection principle. Light $L_{25}$ is refracted and transmitted at the refraction prism 25 and the selectively transmitting and reflecting surface 27a, and light $L_{26}$ is refracted on the transmission surface 21c in which the refraction prisms 25 are not formed and then is reflected at the selectively transmitting and reflecting surface 27a and directed toward the polarization recycling unit 23.

As described above, when light $L_{25}$ and light $L_{26}$ are refracted and transmitted at the transmission surface 21c and the refraction prisms 25, the second refractive index, which is a refractive index of the isotropic layer 27 with respect to light polarized in the second direction, may be larger than the first refractive index of the isotropic layer 21 and the anisotropic layer 27, which is a refractive index with respect to light polarized in the first direction. For example, the first refractive index may have a value of about 1.6, and the second refractive index may have a value of about 1.8.

The second anisotropic layer 29 is formed under the polarization recycling unit 23. The light $L_{21}$, polarized in the first direction, is reflected by the transmission surface 21c and the light $L_{26}$, polarized in the second direction, is transmitted through the transmission surface 21c and is refracted. To this end, the second anisotropic layer 29 includes a reflection surface 29a, which is formed opposite a surface facing the polarization recycling unit 23, which reflects the incident light $L_{26}$. The second anisotropic layer 29 has a third refractive index, different from the first refractive index, with respect to the light $L_{21}$ and has a index equal to the first refractive index with respect to the light $L_{26}$.

The third refractive index may be smaller than the first refractive index so that the light $L_{21}$, polarized in the first direction, is totally reflected at a boundary between the polarization recycling unit 23 and the second anisotropic layer 29. The first refractive index may have a value of about 1.6, and the second refractive index may have a value of about 1.4.

A polarization recycling operation of the LGP 20 illustrated in FIG. 8 will now be described with reference to FIGS. 9 and 10.

FIG. 9 illustrates a case in which S-polarized light is utilized in an LCD unit lit by the LGP 20. $L_{21}$, polarized in the first direction (P-polarized) is transmitted through the first anisotropic layer, is reflected by the selectively transmitting and reflecting surface 27a, and is incident on the polarization recycling unit 23. Referring to FIG. 9, the light $L_{21}$, polarized in the first direction (P-polarized) is incident on the polarization recycling unit 23 and is reflected such that its polarization direction is changed by the polarization recycling unit 23. Thus, the light $L_{21}$ that is reflected from the polarization recycling unit 23 includes both first (P-polarized) and second (S-polarized) polarization components. Thus, light $L_{22}$, having a second polarization direction (S-polarized) is refracted and transmitted at the transmission surface 21c and the selectively transmitting and reflecting surface 27a. On the other hand, light $L_{23}$, polarized in the first direction (P-polarized) is transmitted without refraction by the transmission surface 21c and is totally reflected at the selectively transmitting and reflecting surface 27a. The light $L_{23}$ is then incident on the polarization recycling unit 23 at a predetermined incident angle, and the above-described operation is repeatedly performed.

FIG. 10 illustrates a case in which S-polarized light is utilized in an LCD unit lit by the LGP 20. Light $L_{25}$ and light $L_{26}$, both polarized in the second direction (S-polarized) are incident on the transmission surface 21c. Referring to FIG. 10, the light $L_{25}$ is incident on each of the refraction prisms 25 and is refracted more than light $L_{26}$. Light $L_{25}$ is transmitted at the selectively transmitting and reflecting surface, and light $L_{26}$, which was incident on a portion of the transmission surface 21c in which the refraction prisms 25 are not formed, is incident on the selectively transmitting and reflecting surface 27a at an angle larger than a critical angle. Thus, the light $L_{26}$ is totally reflected by the selectively transmitting and reflecting surface 27a. Light $L_{26}$ is refracted again at the transmission surface 21c and then progresses toward the polarization recycling unit 23. Since the refractive index of the isotropic layer 21 and the refractive index of the second isotropic layer 29, with respect to the light $L_{26}$ polarized in the second direction (P-polarized), are the same, the light $L_{26}$ is transmitted by the polarization recycling unit 23 without refraction. The light $L_{26}$ is reflected at the reflection surface 29a and is then re-incident on the transmission surface 21c. In this case, a portion of the light $L_{26}$ passes through the refraction prisms 25 and is refracted and transmitted by the selectively transmitting and reflecting surface 27a. Another portion of the light $L_{26}$ is reflected at the selectively transmitting and reflecting surface 27a, and the above-described operation is repeatedly performed.

Figure 11:
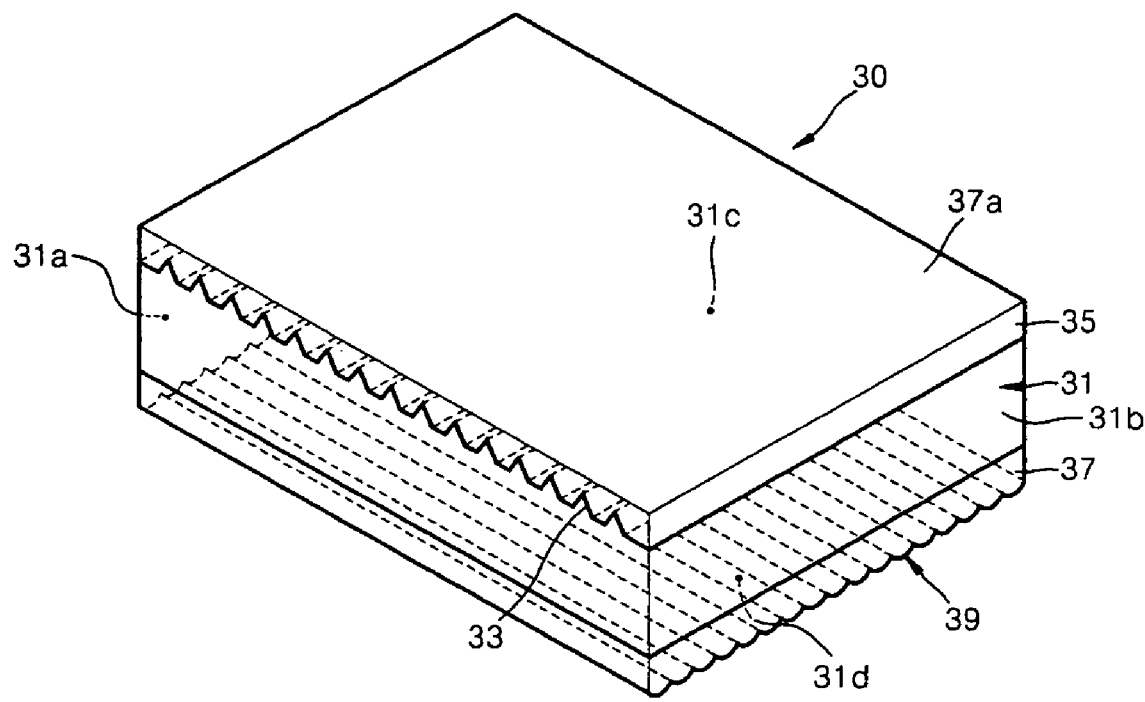
FIG. 11 is a schematic perspective view of an LGP according to another exemplary embodiment of the present invention.
Figure 12:
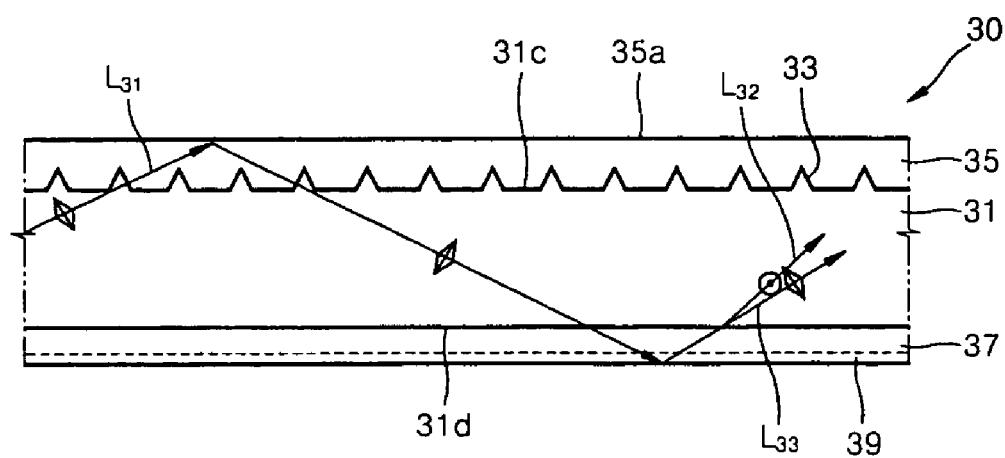
FIG. 12 illustrates a polarization change of P-polarized light incident on the LGP illustrated in FIG. 11.
Figure 13:
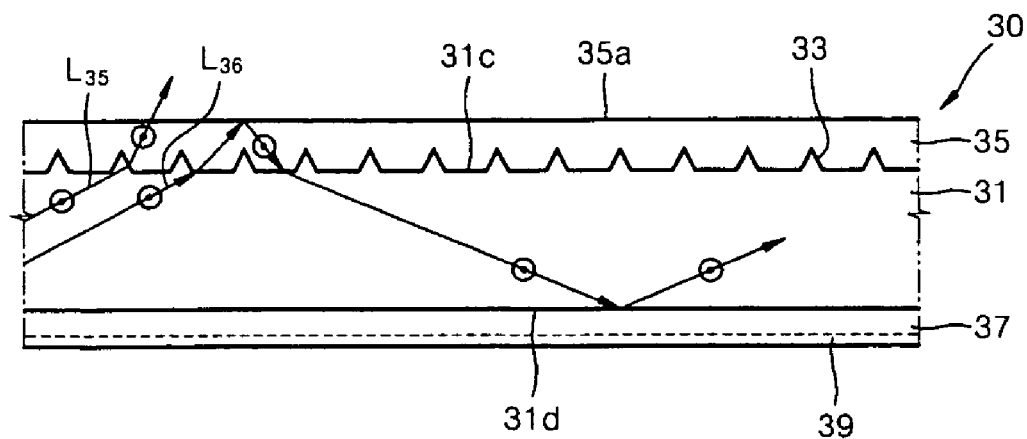
FIG. 13 illustrates a polarization change of S-polarized light incident on the LGP illustrated in FIG. 11.

FIG. 11 is a schematic perspective view of an LGP according to another exemplary embodiment of the present invention, and FIGS. 12 and 13 respectively illustrate a polarization change of each of a P-polarized light and an S-polarized light incident on the LGP illustrated in FIG. 11.

Referring to FIGS. 11, 12, and 13, the LGP 30 includes an isotropic layer 31 formed of an isotropic medium having a first refractive index which is independent of a polarization direction of incident light. The LGP also includes a first anisotropic layer 35 formed on the isotropic layer 31 and having a selectively transmitting and reflecting surface 35a, and a second anisotropic layer 37 formed under the isotropic layer 31.

The isotropic layer 31 includes an incident light surface 31a on which light is incident, an opposite surface 31b formed opposite the incident light surface 31a, and first and second transmission surfaces 31c and 31d which transmit incident light. In addition, the isotropic layer 31 may further include a plurality of refraction prisms 33 on the first transmission surface 31c.

The LGP 30 illustrated in FIG. 11 is different from the LGP 20 illustrated in FIG. 8 in that a polarization recycling unit 39 is formed on one surface of the second anisotropic layer 37, that is, on a surface opposite the second transmission surface 31d. Here, the structure and functions of the polarization recycling unit 39, the refraction prisms 33, and the first isotropic layer 35 are substantially the same as those of the polarization recycling unit (13 of FIGS. 3 and 23 of FIG. 8) of the LGPs 10 and 20 illustrated in FIGS. 3 and 8, the refraction prisms (15 of FIGS. 3 and 25 of FIG. 8) and the first anisotropic layer (27 of FIG. 8), and thus, a detailed description thereof will be omitted.

The second anisotropic layer 37 is formed under the second transmission surface 31d and includes the polarization recycling unit 39 which is formed opposite the second transmission surface 31d and which changes a polarization direction of incident light.

The second anisotropic layer 37 allows a light $L_{31}$, polarized in a first direction, to be transmitted and light $L_{36}$, polarized in a second direction, to be reflected at a boundary with the second transmission surface 31a.

To this end, the second anisotropic layer 37 has a first refractive index, which is the same as that of the isotropic layer 31, with respect to the light $L_{31}$ and has a third refractive index, different from the first refractive index, with respect to light $L_{35}$ and light $L_{36}$.

For example, the third refractive index may be smaller than the first refractive index so that the light $L_{36}$ is totally reflected at a boundary between the second transmission surface 3 id and the second anisotropic layer 37. For example, the first refractive index may be about 1.6, and the third refractive index may be about 1.4.

A polarization recycling operation of the LGP 30 illustrated in FIG. 11 will now be described with reference to FIGS. 12 and 13.

FIG. 12 illustrates a case in which S-polarized light is utilized in an LCD unit lit by the LGP 30. Light $L_{31}$, polarized in the first direction (P-polarized) is incident on the first transmission surface 31c, is transmitted without refraction within the first anisotropic layer, is reflected at the selectively transmitting and reflecting layer and is incident on the polarization recycling unit 39.

The light $L_{31}$ is reflected such that its polarization direction is changed by the polarization recycling unit 39. Thus, the light that is reflected from the polarization recycling unit 39 includes first and second polarization components. Thus, light $L_{32}$, polarized in the second direction (S-polarized) is refracted and transmitted at the second transmission surface 31d, at the first transmission surface 31c, and at the selectively transmitting and reflecting surface 35a. On the other hand, light $L_{33}$, polarized in the first direction (P-polarized) is transmitted without refraction at the first and second transmission surfaces 31c and 31d and is totally reflected at the selectively transmitting and reflecting surface 35a. The light $L_{33}$ is then incident on the polarization recycling unit 39 at a predetermined incident angle, and the above-described operation is repeatedly performed.

FIG. 13 illustrates a case in which S-polarized light is utilized in an LCD unit lit by the LGP 30. Light $L_{35}$ and light $L_{36}$, both polarized in the second direction (S-polarized) are incident on the first transmission surface 31c. Referring to FIG. 13, the light $L_{35}$ is incident on the refraction prisms 33 and is refracted more than light $L_{36}$. Light 35 is transmitted at the selectively transmitting and reflecting surface 35a. The light $L_{36}$ is incident on a portion of the first transmission surface in which the refraction prisms 33 are not formed, is refracted and transmitted at the transmission surface 31c, and is incident on the selectively transmitting and reflecting surface 35a at an angle larger than a critical angle. Thus, the light $L_{36}$ is totally reflected at the selectively transmitting and reflecting surface 35a, is refracted and transmitted at the transmission surface 31c, and progresses toward the second transmission surface 31d. Since the refractive index of the isotropic layer 31 is higher than the refractive index of the second isotropic layer 37, with respect to the light $L_{36}$, the light $L_{36}$ is reflected at a boundary between the isotropic layer 31 and the second anisotropic layer 37. Light 36 is then re-incident on the first transmission surface 31c. In this case, a portion of the re-incident light $L_{36}$ passes through the refraction prisms 33 and is refracted and transmitted by the selectively transmitting and reflecting surface 35a. The other portion of the re-incident light 36 is reflected at the selectively transmitting and reflecting surface 35a, and the above-described operation is repeatedly performed.

Figure 14:
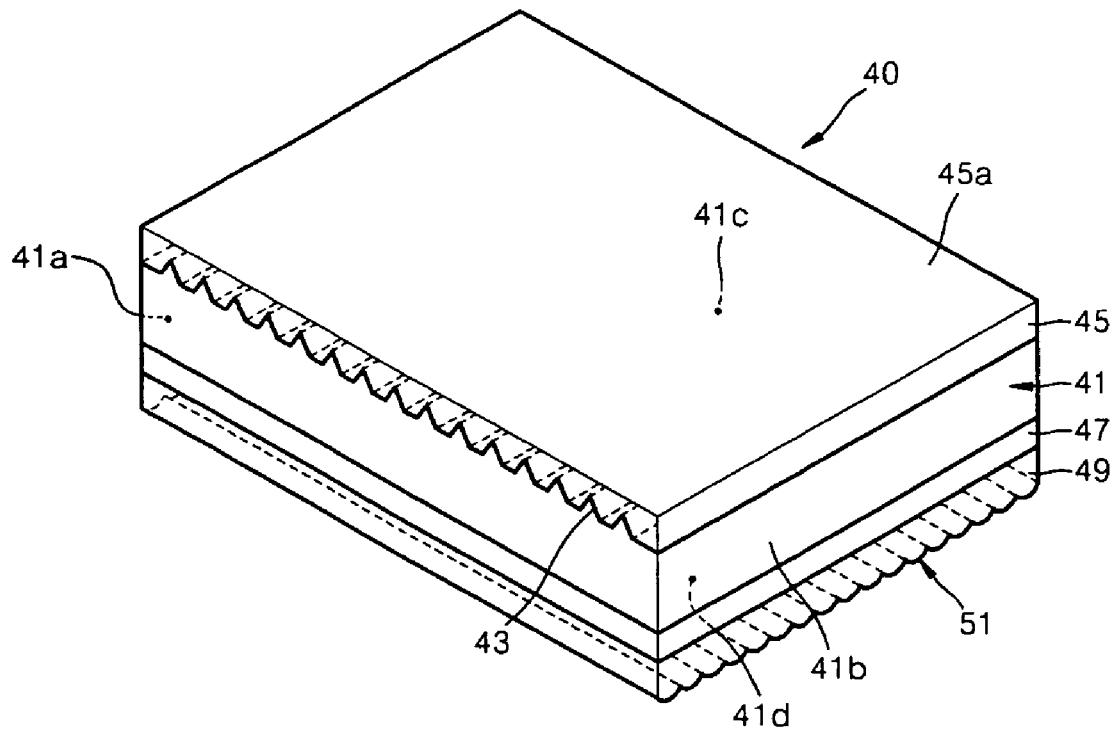
FIG. 14 is a schematic perspective view of an LGP according to another exemplary embodiment of the present invention.
Figure 15:
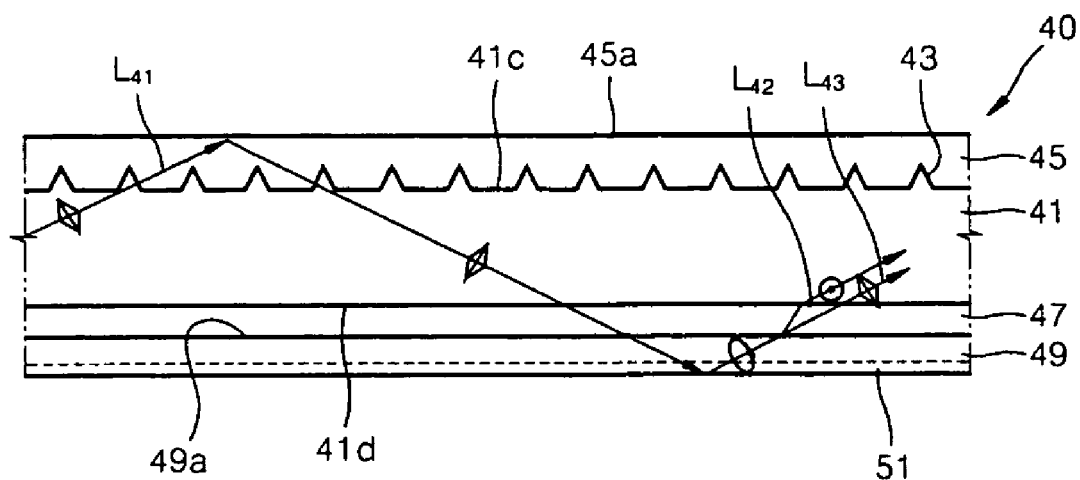
FIG. 15 illustrates a polarization change of P-polarized light incident on the LGP illustrated in FIG. 14.
Figure 16:
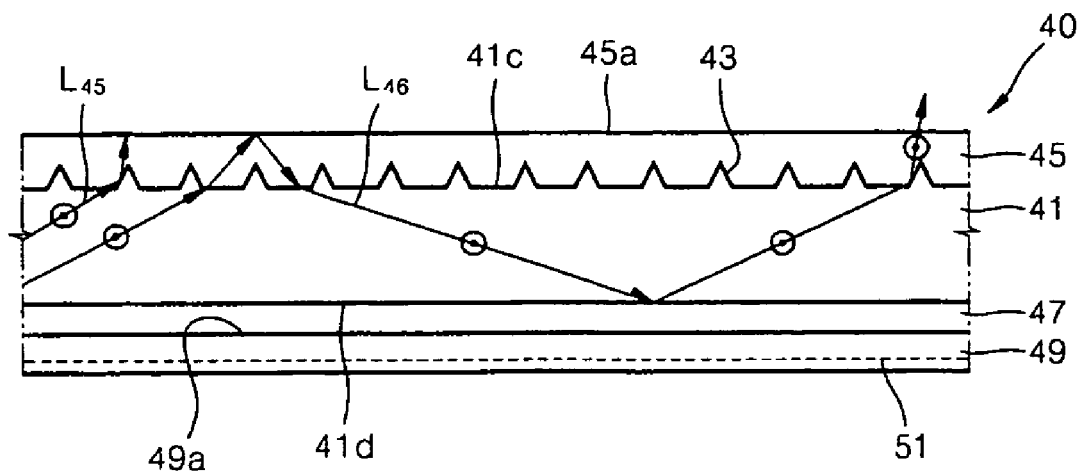
FIG. 16 illustrates a polarization change of S-polarized light incident on the LGP illustrated in FIG. 14.

FIG. 14 is a schematic perspective view of an LGP according to another exemplary embodiment of the present invention, and FIGS. 15 and 16 respectively illustrate a polarization change of each of a P-polarized light and an S-polarized light incident on the LGP illustrated in FIG. 14.

Referring to FIGS. 14, 15, and 16, the LGP 40 includes a first isotropic layer 41 formed of an isotropic medium having a first refractive index which is independent of a polarization direction of incident light, a first anisotropic layer 45 formed on the isotropic layer 41. The first anisotropic layer has a selectively transmitting and reflecting surface 45a. the LGP also includes a second anisotropic layer 47, formed under the isotropic layer 41, and a second isotropic layer 49, formed under the second anisotropic layer 47 and having a polarization recycling unit 51.

The first isotropic layer 41 includes an incident light surface 41a on which light is incident; an opposite surface 41b, formed opposite the incident light surface 41a; and first and second transmission surfaces 41c and 41d which transmit incident light. In addition, the first isotropic layer 41 may further include a plurality of refraction prisms 43 on the first transmission surface 41c.

The LGP 40 illustrated in FIG. 14 is different from the LGP 30 illustrated in FIG. 11 in that the LGP 40 includes double-layer-structure isotropic layers and a polarization recycling unit 51 is formed on one surface of the second anisotropic layer 49, that is, on a surface opposite the second anisotropic layer 47. Here, the structure and functions of the polarization recycling unit 51, the refraction prisms 43, and the first isotropic layer 45 are substantially the same as those of the polarization recycling unit (13 of FIGS. 3 and 23 of FIG. 8) of the LGP 10 and 20 illustrated in FIGS. 3 and 8, the refraction prisms (15 of FIG. 3 and 25 of FIG. 8) and the first anisotropic layer (27 of FIG. 8), and thus, a detailed description thereof will be omitted.

The second anisotropic layer 47 is formed under the second transmission surface 41d and allows light $L_{41}$, polarized in a first direction, to be transmitted and light $L_{46}$, polarized in a second direction, to be reflected at a boundary with the second transmission surface 41d. To this end, the second anisotropic layer 57 has a first refractive index, which is the same as that of the first isotropic layer 41, with respect to light $L_{41}$ and has a third refractive index, different from the first refractive index, with respect to light $L_{45}$ and light $L_{46}$.

For example, the third refractive index may be smaller than the first refractive index so that the light $L_{46}$ is totally reflected at a boundary between the second transmission surface 41d and the second anisotropic layer 47. For example, the first refractive index may be about 1.6, and the third refractive index may be about 1.4.

The second isotropic layer 49 includes a third transmission surface 49a, at a juncture with the second anisotropic layer 47, and the polarization recycling unit 51, formed opposite surface the third transmission surface 49a. The polarization recycling unit changes a polarization direction of incident light. In addition, the second isotropic layer 49 is formed of an isotropic medium having the same refractive index as the first isotropic layer 41, that is, having a first refractive index.

A polarization recycling operation of the LGP 40 illustrated in FIG. 14 will now be described with reference to FIGS. 15 and 16.

FIG. 15 illustrates a case in which S-polarized light is utilized in an LCD unit lit by the LGP 40. Light $L_{41}$, having a first polarization (P-polarized) is transmitted without refraction at the first transmission surface, is reflected at the selectively transmitting and reflecting surface 45a, is transmitted by the second transmission surface and the third transmission surface, and is incident on the polarization recycling unit 51.

The light $L_{41}$ is reflected at the polarization recycling unit such that its polarization direction is changed. Thus, the light that is reflected from the polarization recycling unit 51 includes first and second polarization components. Thus, light $L_{42}$, having the second polarization direction, is refracted and transmitted by the third transmission surface 49a, the second transmission surface 41d, the first transmission surface 41c, and the selectively transmitting and reflecting surface 45a. On the other hand, light $L_{43}$, having the first polarization direction, is transmitted by the third transmission surface 49a, the second transmission surface 41d, and the first transmission surface 41c without refraction. The light $L_{43}$ is then totally reflected by the selectively transmitting and reflecting surface 45a and is incident on the polarization recycling unit 51 at a predetermined incident angle, and the above-described operation is repeatedly performed.

FIG. 16 illustrates a case in which S-polarized light is utilized in an LCD unit lit by the LGP 40. Light $L_{45}$ and light $L_{46}$, both of which have the second polarization direction (S-polarized) and are incident on the first transmission surface of the first anisotropic layer 45. Referring to FIG. 16, the light $L_{45}$ is incident on the refraction prisms 43 and is refracted more than light $L_{46}$. Light $L_{45}$ is refracted and transmitted by the first transmission surface and is transmitted at the selectively transmitting and reflecting surface 45a. The light $L_{46}$ is incident on a portion of the first transmission surface 41c in which the refraction prisms 43 are not formed, is refracted and transmitted at the first transmission surface 41c, and is incident on the selectively transmitting and reflecting surface 45a at an angle larger than a critical angle. Thus, the light $L_{46}$ is totally reflected from the selectively transmitting and reflecting surface 45a, is refracted and transmitted at the first transmission surface 41c, and progresses toward the second transmission surface 41d. Since the refractive index of the first isotropic layer 41 is higher than the refractive index of the second isotropic layer 47, with respect to the light $L_{46}$, the light $L_{46}$ is reflected at a boundary between the first isotropic layer 51 and the second anisotropic layer 47 and is then re-incident on the first transmission surface 41c. In this case, a portion of the re-incident light $L_{46}$ passes through the refraction prisms 43 and is refracted and transmitted at the selectively transmitting and reflecting surface 45a. The other portion of the light $L_{46}$ is reflected from the selectively transmitting and reflecting surface 45a, and the above-described operation is repeatedly performed.

Figure 17:
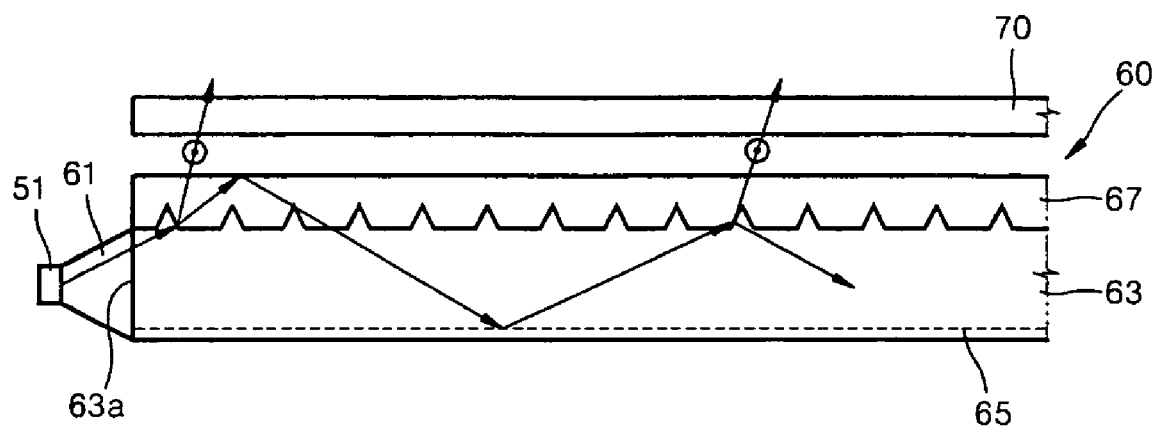
FIG. 17 is a schematic cross-sectional view of a back light unit according to an exemplary embodiment of the present invention.

FIG. 17 is a schematic cross-sectional view of a back light unit according to an exemplary embodiment of the present invention. Referring to FIG. 17, the back light unit includes a LGP 60 and a light source 51 disposed at one side of the LGP 60.

The light source 51 is a line light source, such as a cold cathode fluorescent lamp (CCFL), or a point light source, such as a light emitting diode (LED). The light source 51 irradiates light onto the side of the LGP 60. Here, when a point light source is used as the light source 51, the light source 51 may include a plurality of point light sources so as to uniformly illuminate light on a plane. An incident light portion 61 for guiding an incident angle of the illuminated light may be disposed between the point light source and the LGP 60.

The LGP 60 guides light incident from the light source 51 and includes an isotropic layer 63, having a polarization recycling unit 65, and an anisotropic layer 67, which has a refractive index which is dependent on a polarization direction of the incident light. The LGP 60 can be one of the LGPs 10, 20, 30, and 40 illustrated in FIGS. 3, 8, 11, and 14.

Thus, in the back light unit according to the present invention, only light polarized in a predetermined direction is emitted by the LGP 60. Thus, when a back light of a liquid crystal display (LCD) 70, which only utilizes light polarized in a predetermined direction, the back light unit provides light polarized in the predetermined direction.

As described above, only light polarized in a predetermined direction is emitted by the LGP to an LCD panel via the anisotropic layer and the polarization recycling unit of the LGP. This provides increased brightness for the LCD.

While the present invention has been particularly shown and described with reference to exemplary embodiments thereof, it will be understood by those skilled in the art that various changes in form and details may be made therein without departing from the spirit and scope of the invention as defined by the appended claims.

What is claimed is:

1. A light guide panel comprising:
an isotropic layer, comprising
an incident light surface through which light from a light source is incident,
a transmission surface through which light is transmitted, and
a polarization recycling unit, disposed on a surface of the isotropic layer opposite the transmission surface, which changes a polarization direction of light,
wherein the isotropic layer has a first refractive index; and
an anisotropic layer, formed on the transmission surface of the isotropic layer, comprising
a selectively transmitting and reflecting surface, disposed opposite the transmission surface of the isotropic layer, which reflects a first portion of incident light and transmits a second portion of incident light;
wherein the anisotropic layer has a first refractive index, identical to the first refractive index of the isotropic layer, with respect to light having a first polarization and has a second refractive index, different from the first refractive index, with respect to light having a second polarization, such that light having the first polarization is transmitted without refraction at a boundary between the anisotropic layer and the transmission surface of the isotropic layer and light having the second polarization is refracted and transmitted at the boundary between the anisotropic layer and the transmission surface of the isotropic layer.

2. The light guide panel of claim 1, wherein
light having the second polarization is refracted and transmitted by the isotropic layer, and
a plurality of refraction prisms, which are separated from one another, are formed on the transmission surface of the isotropic layer.

3. The light guide panel of claim 2, wherein the refraction prisms are separated from one another in a direction substantially parallel to the selectively transmitting and reflecting surface of the anisotropic layer.

4. The light guide panel of claim 1, wherein the second refractive index is higher than the first refractive index so that an angle of emission of the light having the second polarization is smaller than an angle of incidence of the light having the second polarization at the transmission surface of the isotropic layer.

5. The light guide panel of claim 1, wherein
the polarization recycling unit comprises a plurality of polarization conversion members each having a cylindrical shape or a prism shape,
the polarization conversion members are adjacent to each other in a direction parallel to the plane of the incident light surface, and
the polarization conversion members each have a length perpendicular to the plane of the incident light surface.

6. The light guide panel of claim 1,
wherein the anisotropic layer is a first anisotropic layer and the light guide panel further comprises a second anisotropic layer disposed on the polarization recycling unit;
wherein the second anisotropic layer comprises a reflection surface opposite the boundary between the polarization recycling unit and the second anisotropic layer;
wherein the light having the first polarization is reflected at a boundary between the polarization recycling unit and the second anisotropic layer and the light having the second polarization is transmitted through the boundary between the polarization recycling unit and the second anisotropic layer and is reflected by the reflection surface;

wherein, with respect to the light having the first polarization, the second anisotropic layer has a third refractive index different from the first refractive index and with respect to the light having the second polarization, the second anisotropic layer has a refractive index equal to the first refractive index of the isotropic layer.

7. The light guide panel of claim 6, wherein the third refractive index is smaller than the first refractive index.

8. A light guide panel comprising:
an isotropic layer, comprising
an incident light surface through which light from a light source is incident, and
first and second transmission surfaces, opposite each other, through which light is transmitted,
wherein the isotropic layer has a first refractive index;
a first anisotropic layer disposed on the first transmission surface of the isotropic layer, comprising
a selectively transmitting and reflecting surface, disposed opposite the first transmission surface, which reflects a first portion of incident light and transmits a second portion of incident light,
wherein the first anisotropic layer has a first refractive index, identical to the first refractive index of the isotropic layer, with respect to light having a first polarization, and has a second refractive index, different from the first refractive index, with respect to light having a second polarization, such that light having the first polarization is transmitted without refraction at a boundary between the first anisotropic layer and the first transmission surface of the isotropic layer and light having the second polarization is refracted and transmitted at the boundary between the first anisotropic layer and the first transmission surface of the isotropic layer; and
a second anisotropic layer disposed on the second transmission surface of the isotropic layer, comprising
a polarization recycling unit disposed opposite the second transmission surface, which changes a polarization direction of light,
wherein light having the first polarization is transmitted without refraction at a boundary between the second transmission surface of the isotropic layer and the second anisotropic layer, and light having the second polarization is reflected at the boundary between the second transmission surface of the isotropic layer and the second anisotropic layer, and
wherein the second anisotropic layer has a first refractive index identical to the first refractive index of the isotropic layer with respect to light having the first polarization, and has a third refractive index, different from the first refractive index, with respect to light having the second polarization.

9. The light guide panel of claim 8,
wherein light having the second polarization is refracted and transmitted by the isotropic layer, and
a plurality of refraction prisms, which are separated from one another, are formed on the first transmission surface of the isotropic layer.

10. The light guide panel of claim 9, wherein the refraction prisms are separated from one another in a direction substantially parallel to the selectively transmitting and reflecting surface of the first anisotropic layer.

11. The light guide panel of claim 8, wherein the second refractive index is higher than the first refractive index so that an angle of emission of the light having the second polarization is smaller than an angle of incidence of the light having the second polarization at the first transmission surface of the isotropic layer.

12. The light guide panel of claim 8,
wherein the third refractive index is smaller than the first refractive index.

13. The light guide panel of claim 8, wherein
the polarization recycling unit comprises a plurality of polarization conversion members each having a cylindrical shape or a prism shape,
the polarization conversion members are adjacent to each other in a direction parallel to the plane of the incident light surface, and
the polarization conversion members each have a length perpendicular to the plane of the incident light surface.

14. A light guide panel comprising:
a first isotropic layer, comprising
an incident light surface through which light from a light source is incident,
first and second transmission surfaces, opposite each other, through which light is transmitted,
wherein the isotropic layer has a first refractive index;
a first anisotropic layer disposed on the first transmission surface of the isotropic layer, comprising
a selectively transmitting and reflecting surface, disposed opposite the first transmission surface, which reflects a first portion of incident light and transmits a second portion of incident light,
wherein the first anisotropic layer has a first refractive index, identical to the first refractive index of the isotropic layer, with respect to light having a first polarization, and has a second refractive index, different from the first refractive index, with respect to light having a second polarization, such that light having the first polarization is transmitted without refraction at a boundary between the first anisotropic layer and the first transmission surface of the isotropic layer and light having the second polarization is refracted and transmitted at the boundary between the first anisotropic layer and the first transmission surface of the isotropic layer;
a second anisotropic layer disposed on the second transmission surface of the isotropic layer
wherein light having the first polarization is transmitted without refraction at a boundary between the second transmission surface of the isotropic layer and the second anisotropic layer, and light having the second polarization is reflected at the boundary between the second transmission surface of the isotropic layer and the second anisotropic layer, and
wherein the second anisotropic layer has a first refractive index, identical to the first refractive index of the isotropic layer, with respect to light having the first polarization, and has a third refractive index, different from the first refractive index, with respect to light having the second polarization; and
a second isotropic layer, comprising
a third transmission surface at a boundary between the second anisotropic layer and the second isotropic layer, and
a polarization recycling unit disposed opposite the third transmission surface, which changes a polarization direction of light, wherein the second isotropic layer has a first refractive index identical to the first refractive index of the first isotropic layer.

15. The light guide panel of claim 14,
wherein the light having the second polarization is refracted and transmitted by the first isotropic layer, and
a plurality of refraction prisms, which are separated form one another, are formed on the first transmission surface of the first isotropic layer.

16. The light guide panel of claim 15, wherein the refraction prisms are separated from one another in a direction substantially parallel to the selectively transmitting and reflecting surface of the first anisotropic layer.

17. The light guide panel of claim 14, wherein the second refractive index is higher than the first refractive index so that an angle of emission of the light having the second polarization is smaller than an angle of incidence of the light having the second polarization at the first transmission surface of the isotropic layer.

18. The light guide panel of claim 14,
wherein the third refractive index is smaller than the first refractive index.

19. The light guide panel of claim 14,
wherein the polarization recycling unit comprises a plurality of polarization conversion members each having a cylindrical shape or a prism shape,
wherein the polarization conversion members are adjacent to each other in a direction parallel to the plane of the incident light surface, and
wherein the polarization conversion members each have a length perpendicular to the plane of the incident light surface.

20. A back light unit comprising:
at least one light source which irradiates light; and
the light guide panel of claim 1.

21. The back light unit of claim 20,
wherein the anisotropic layer is a first anisotropic layer and the light guide panel further comprises a second anisotropic layer disposed on the polarization recycling unit;
wherein the second anisotropic layer comprises a reflection surface opposite the boundary between the polarization recycling unit and the second anisotropic layer;
wherein the light having the first polarization is reflected at a boundary between the polarization recycling unit and the second anisotropic layer and the light having the second polarization is transmitted through the boundary between the polarization recycling unit and the second anisotropic layer and is reflected by the reflection surface;
wherein, with respect to the light having the first polarization, the second anisotropic layer has a third refractive index different from the first refractive index and with respect to the light having the second polarization, the second anisotropic layer has a refractive index equal to the first refractive index of the isotropic layer.

22. A back light unit comprising:
at least one light source which irradiates light; and
the light guide panel of claim 8.

23. A back light unit comprising:
at least one light source which irradiates light; and
the light guide panel of claim 14.

* * * * *